(12) United States Patent
Liao et al.

(10) Patent No.: US 12,317,287 B2
(45) Date of Patent: May 27, 2025

(54) CORESET CONFIGURATIONS

(71) Applicant: Mediatek Inc., Hsin-Chu (TW)

(72) Inventors: Yiju Liao, Hsinchu (TW); Chien Hwa Hwang, Hsinchu (TW); Chien-Chang Li, Hsinchu (TW); Pei-Kai Liao, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 18/133,008

(22) Filed: Apr. 11, 2023

(65) Prior Publication Data

US 2023/0247641 A1 Aug. 3, 2023

Related U.S. Application Data

(63) Continuation of application No. 16/007,156, filed on Jun. 13, 2018, now abandoned.

(60) Provisional application No. 62/520,614, filed on Jun. 16, 2017.

(51) Int. Cl.
| | | |
|---|---|---|
| *H04W 72/23* | (2023.01) | |
| *H04L 5/00* | (2006.01) | |
| *H04W 56/00* | (2009.01) | |
| *H04W 74/0833* | (2024.01) | |
| *H04W 76/27* | (2018.01) | |

(52) U.S. Cl.
CPC .......... *H04W 72/23* (2023.01); *H04L 5/0048* (2013.01); *H04W 56/001* (2013.01); *H04W 74/0833* (2013.01); *H04W 76/27* (2018.02)

(58) Field of Classification Search
CPC ... H04L 5/0053; H04L 5/0048; H04L 5/0007; H04W 56/001; H04W 76/27; H04W 74/0833; H04W 72/23
See application file for complete search history.

(56) References Cited

U.S. PATENT DOCUMENTS

| | | | | |
|---|---|---|---|---|
| 9,716,576 | B2* | 7/2017 | Chun | H04L 5/0023 |
| 10,491,328 | B2* | 11/2019 | Jung | H04L 5/0051 |
| 11,026,199 | B2* | 6/2021 | Nam | H04L 5/0044 |
| 11,115,868 | B2* | 9/2021 | Kim | H04L 5/0091 |
| 2013/0044727 | A1* | 2/2013 | Nory | H04L 5/0051 |
| | | | | 370/330 |
| 2015/0358124 | A1* | 12/2015 | Suzuki | H04L 5/0055 |
| | | | | 370/329 |
| 2018/0192383 | A1* | 7/2018 | Nam | H04L 5/0053 |
| 2018/0227074 | A1* | 8/2018 | Sun | H04L 5/001 |
| 2018/0227156 | A1* | 8/2018 | Papasakellariou | H04L 27/2613 |
| 2018/0227777 | A1* | 8/2018 | Sun | H04W 24/08 |
| 2018/0227922 | A1* | 8/2018 | Lee | H04W 72/1273 |

(Continued)

FOREIGN PATENT DOCUMENTS

WO WO-2018208059 A1 * 11/2018 ........... H04B 7/0695

*Primary Examiner* — Mehmood B. Khan
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE receives a CORESET configuration specifying one or more properties of a first CORESET. The UE also determines time and frequency resource elements of the first CORESET based on the one or more properties. The UE performs blind decoding on down-link control channel candidates in a search space carried by the first CORESET to obtain a down-link control channel.

18 Claims, 14 Drawing Sheets

(56) References Cited

U.S. PATENT DOCUMENTS

| | | | |
|---|---|---|---|
| 2018/0279289 A1* | 9/2018 | Islam | H04W 72/0446 |
| 2018/0287762 A1* | 10/2018 | Sun | H04L 5/0053 |
| 2018/0288747 A1* | 10/2018 | Sun | H04W 72/23 |
| 2018/0288749 A1* | 10/2018 | Sun | H04L 5/0048 |
| 2018/0302186 A1* | 10/2018 | Reddy | H04L 1/0072 |
| 2018/0309560 A1* | 10/2018 | Tang | H04L 5/0053 |
| 2018/0324770 A1* | 11/2018 | Nogami | H04L 5/005 |
| 2018/0324830 A1* | 11/2018 | Islam | H04L 5/0053 |
| 2018/0332655 A1* | 11/2018 | Ang | H04W 52/0216 |
| 2018/0343653 A1* | 11/2018 | Guo | H04W 72/542 |
| 2019/0150110 A1* | 5/2019 | Ko | H04J 11/00 370/350 |
| 2019/0165904 A1* | 5/2019 | Jo | H04L 5/0053 |
| 2019/0200332 A1* | 6/2019 | Hwang | H04L 5/0082 |
| 2019/0208479 A1* | 7/2019 | Kim | H04L 5/0053 |
| 2019/0230685 A1* | 7/2019 | Park | H04L 1/1854 |
| 2019/0350049 A1* | 11/2019 | Miao | H04L 5/0085 |
| 2019/0356524 A1* | 11/2019 | Yi | H04B 7/0617 |
| 2019/0357185 A1* | 11/2019 | Kwak | H04L 1/0075 |
| 2020/0021419 A1* | 1/2020 | Taherzadeh Boroujeni | H04L 5/0007 |
| 2020/0154467 A1* | 5/2020 | Gong | H04W 76/27 |
| 2020/0235874 A1* | 7/2020 | Yeo | H04W 72/23 |
| 2021/0136733 A1* | 5/2021 | Miao | H04W 72/23 |

\* cited by examiner

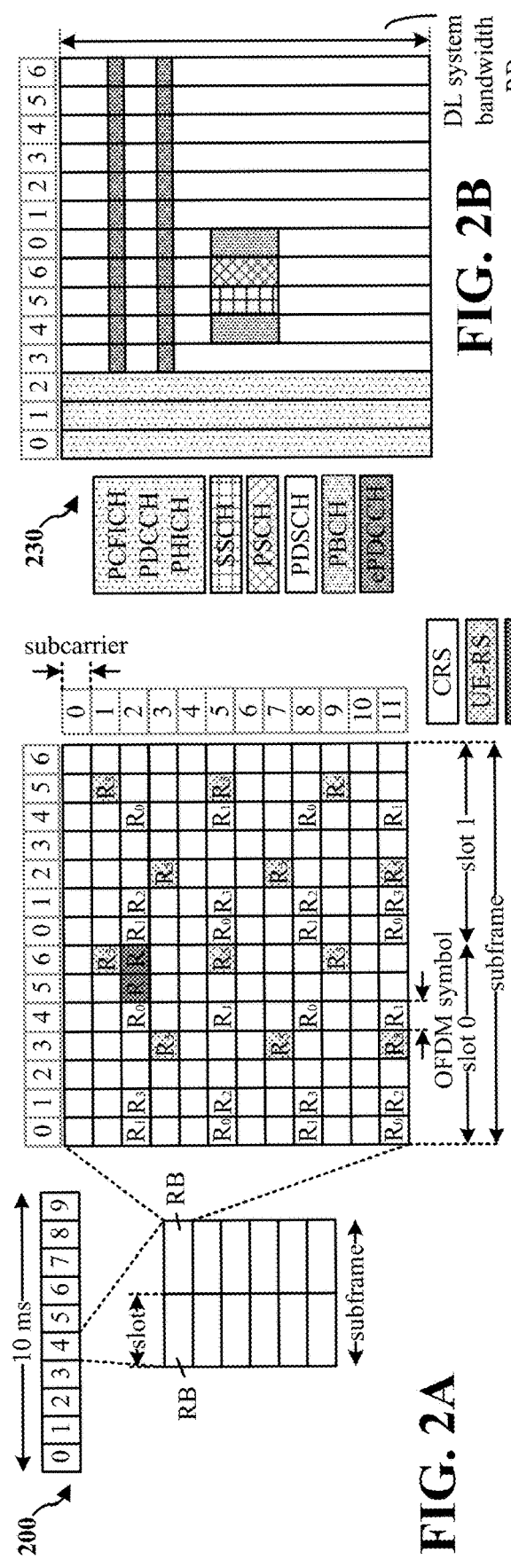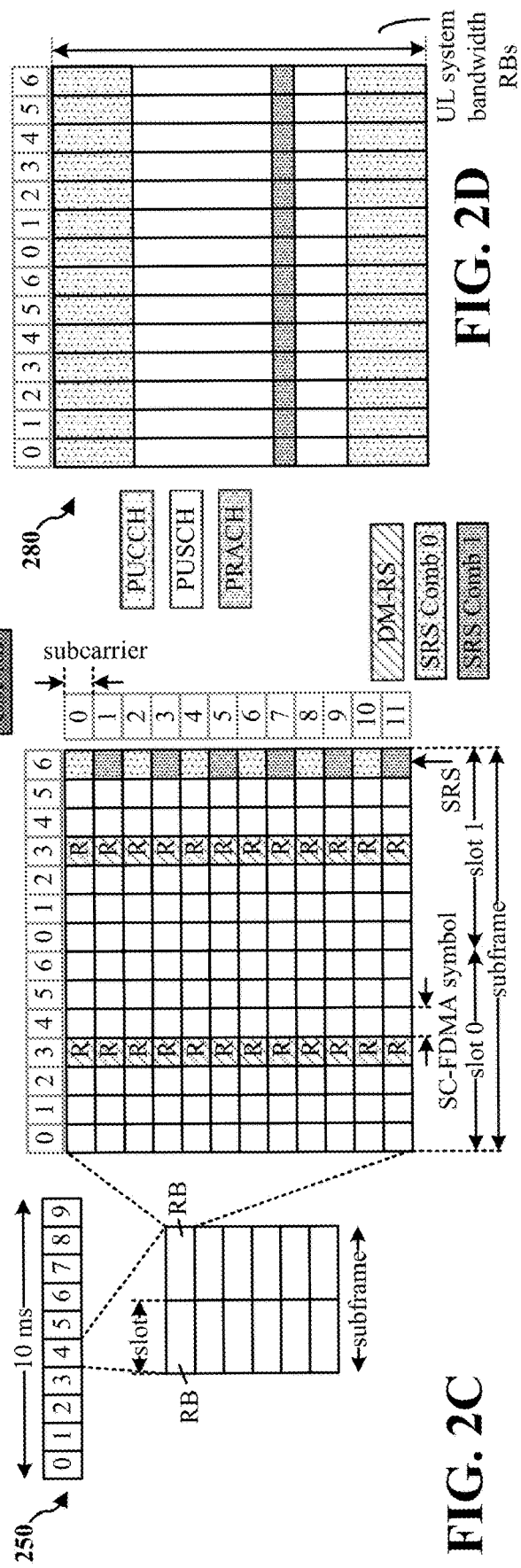

CORESET CONFIGURATIONS

CROSS-REFERENCE TO RELATED APPLICATION(S)

This application is a continuation of U.S. patent application Ser. No. 16/007,156, entitled "DESIGN OF CORESET CONFIGURATIONS" and filed on Jun. 13, 2018, which claims the benefit of U.S. Provisional Application Ser. No. 62/520,614, entitled "DESIGN OF CORESET CONFIGURATIONS" and filed on Jun. 16, 2017. The content of each of the above applications is expressly incorporated by reference herein in its entirety.

BACKGROUND

Field

The present disclosure relates generally to communication systems, and more particularly, to a UE that determines a control resource set (CORESET) based on a CORESET configuration received.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a CORESET configuration specifying one or more properties of a first CORESET. The UE also determines time and frequency resource elements of the first CORESET based on the one or more properties. The UE performs blind decoding on down-link control channel candidates in a search space carried by the first CORESET to obtain a down-link control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
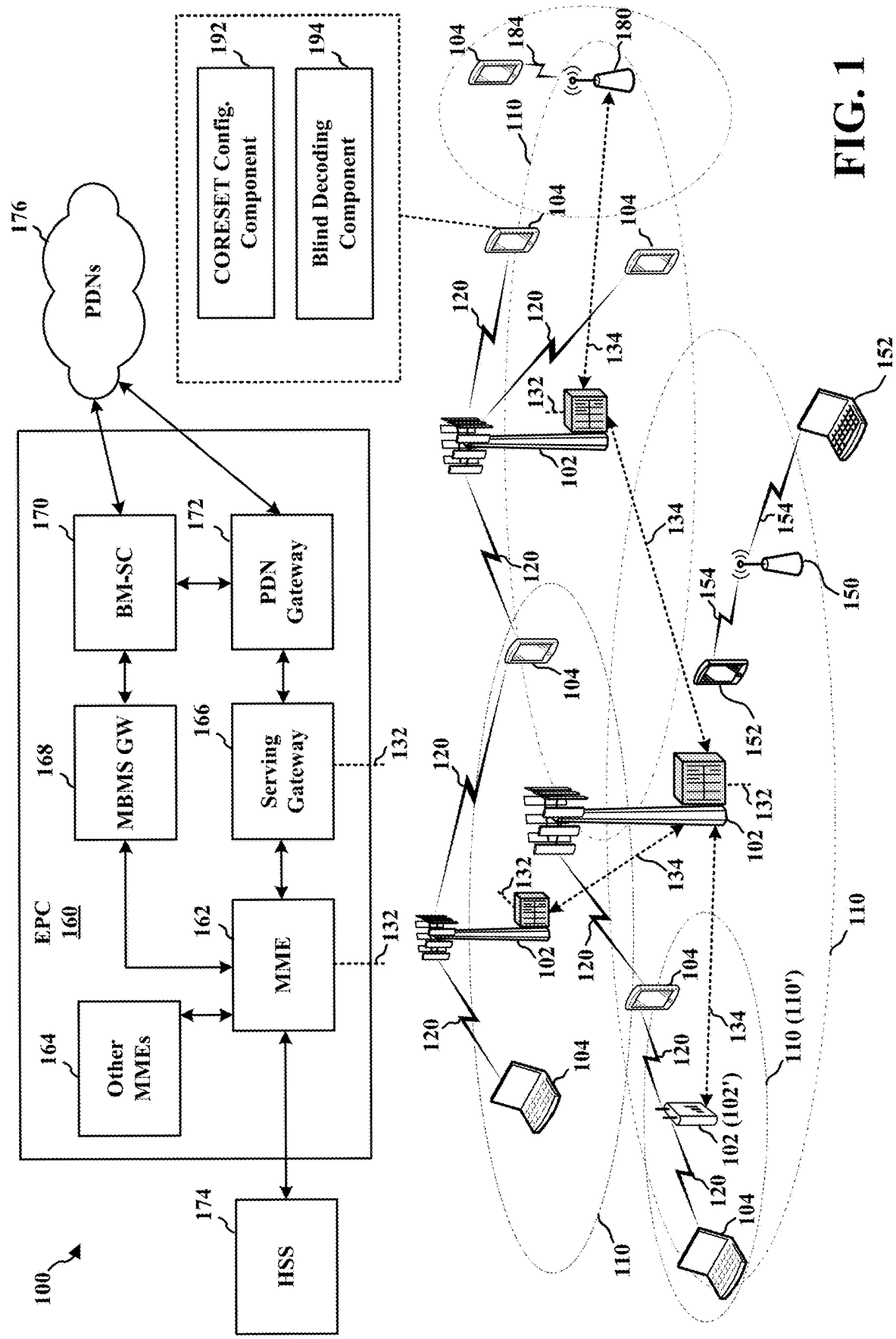
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a CORESET configuration component 192 and a blind decoding component 194. The CORESET configuration component 192 receives a CORESET configuration specifying one or more properties of a first CORESET. The blind decoding component 194 determines time and frequency resource elements of the first CORESET based on the one or more properties. The blind decoding component 194 performs blind decoding on down-link control channel candidates in a search space carried by the first CORESET to obtain a down-link control channel.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
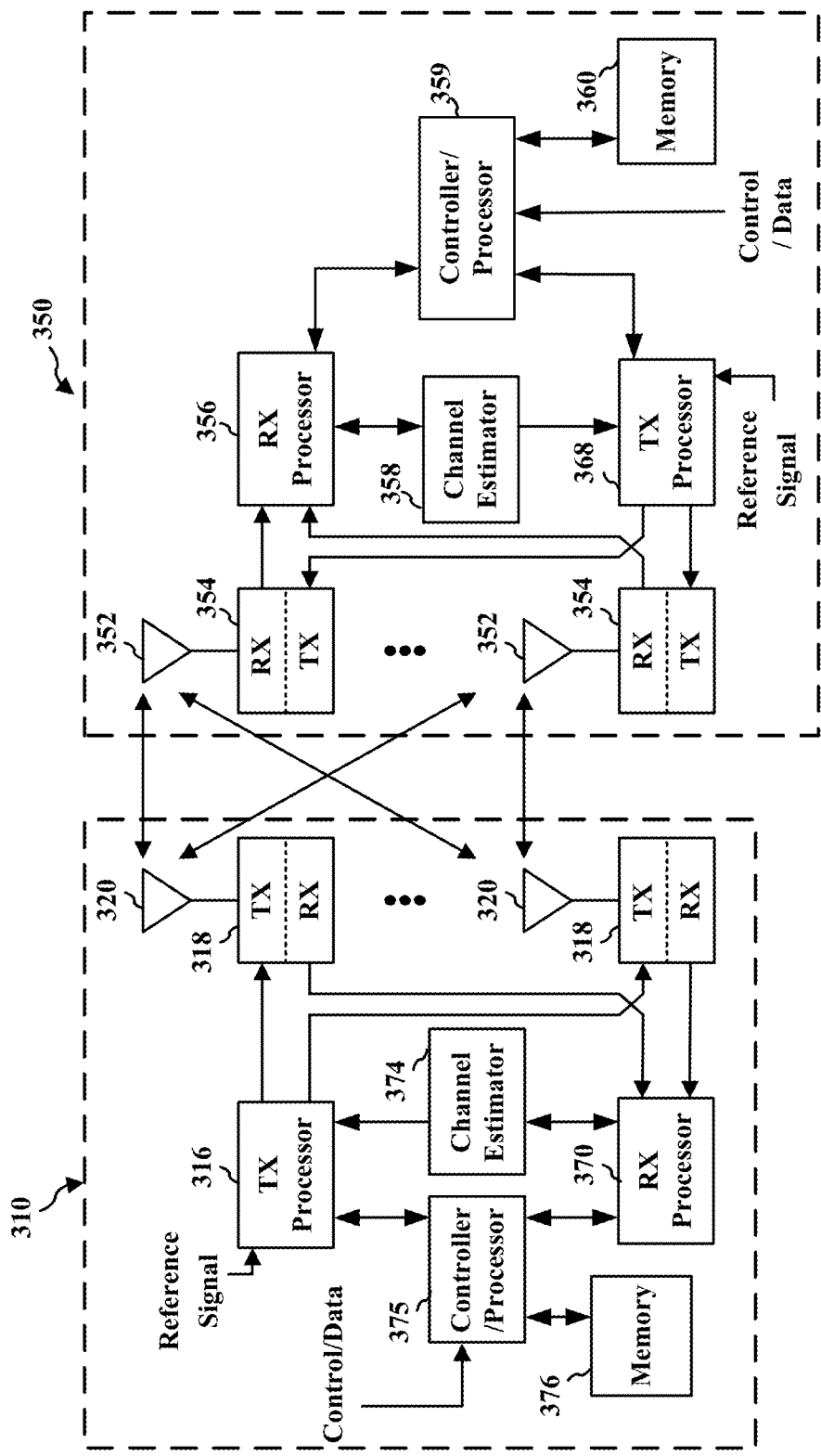
FIG. 3 is a diagram illustrating a base station in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 4:
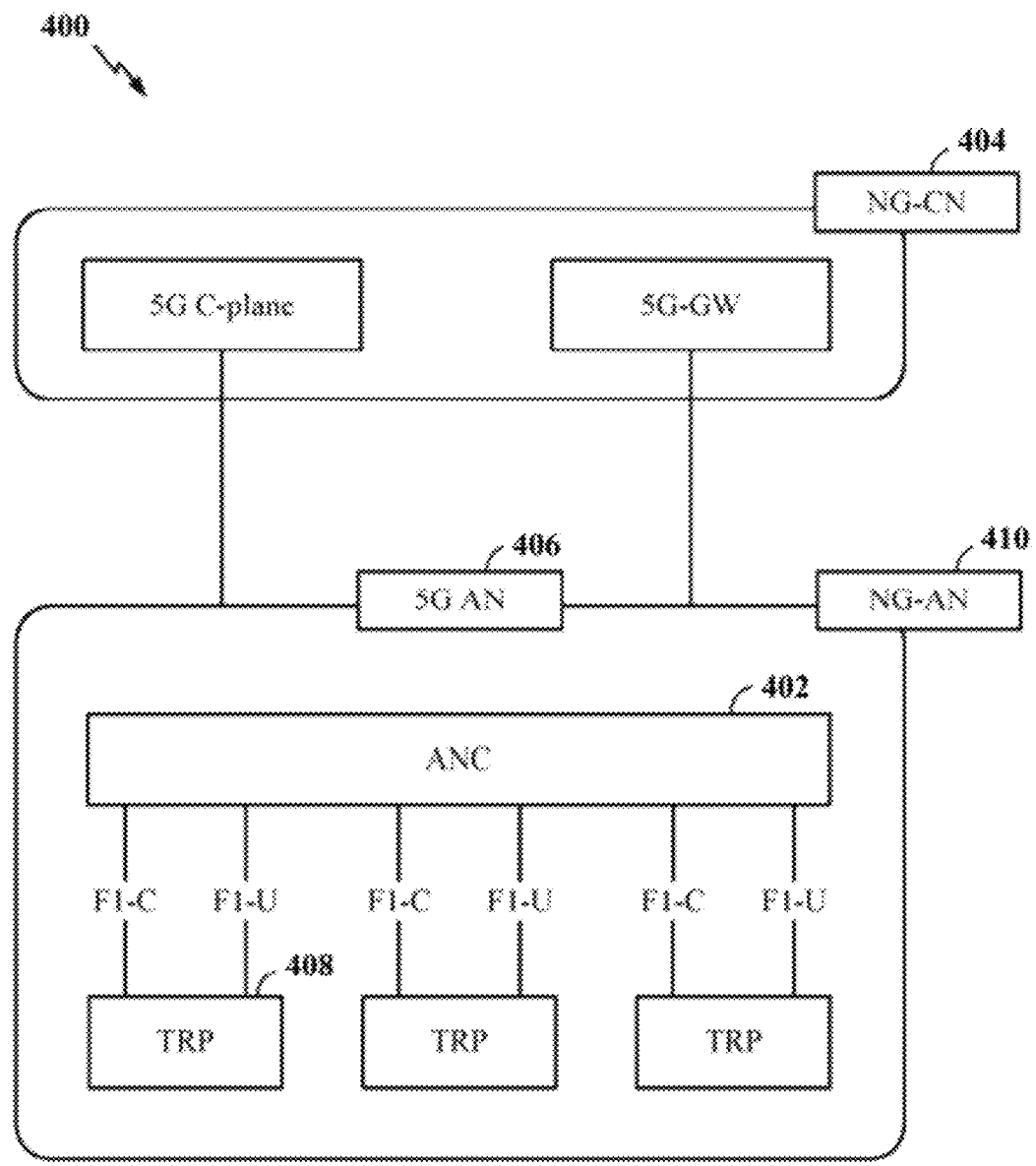
FIG. 4 illustrates an example logical architecture of a distributed access network.

FIG. 4 illustrates an example logical architecture 400 of a distributed RAN, according to aspects of the present disclosure. A 5G access node 406 may include an access node controller (ANC) 402. The ANC may be a central unit (CU) of the distributed RAN 400. The backhaul interface to the next generation core network (NG-CN) 404 may terminate at the ANC. The backhaul interface to neighboring next generation access nodes (NG-ANs) may terminate at the ANC. The ANC may include one or more TRPs 408 (which may also be referred to as BSs, NR BSs, Node Bs, 5G NBs, APs, or some other term). As described above, a TRP may be used interchangeably with "cell."

The TRPs 408 may be a distributed unit (DU). The TRPs may be connected to one ANC (ANC 402) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 400 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 410 may support dual connectivity with NR. The NG-AN may share a common fronthaul for LTE and NR.

The architecture may enable cooperation between and among TRPs 408. For example, cooperation may be preset within a TRP and/or across TRPs via the ANC 402. According to aspects, no inter-TRP interface may be needed/present.

According to aspects, a dynamic configuration of split logical functions may be present within the architecture of the distributed RAN 400. The PDCP, RLC, MAC protocol may be adaptably placed at the ANC or TRP.

Figure 5:
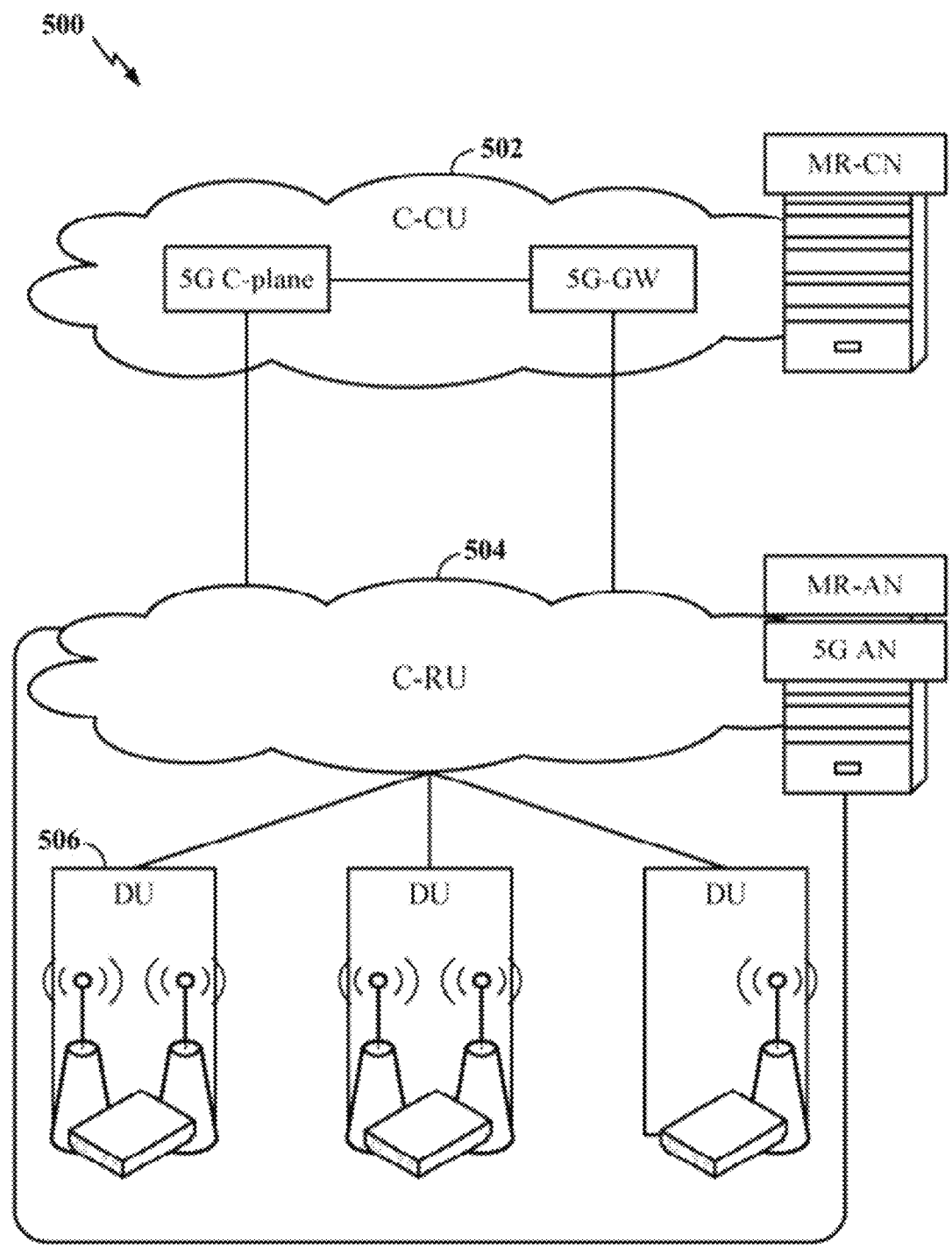
FIG. 5 illustrates an example physical architecture of a distributed access network.

FIG. 5 illustrates an example physical architecture of a distributed RAN 500, according to aspects of the present disclosure. A centralized core network unit (C-CU) 502 may host core network functions. The C-CU may be centrally deployed. C-CU functionality may be offloaded (e.g., to advanced wireless services (AWS)), in an effort to handle peak capacity. A centralized RAN unit (C-RU) 504 may host one or more ANC functions. Optionally, the C-RU may host core network functions locally. The C-RU may have distributed deployment. The C-RU may be closer to the network edge. A distributed unit (DU) 506 may host one or more TRPs. The DU may be located at edges of the network with radio frequency (RF) functionality.

Figure 6:
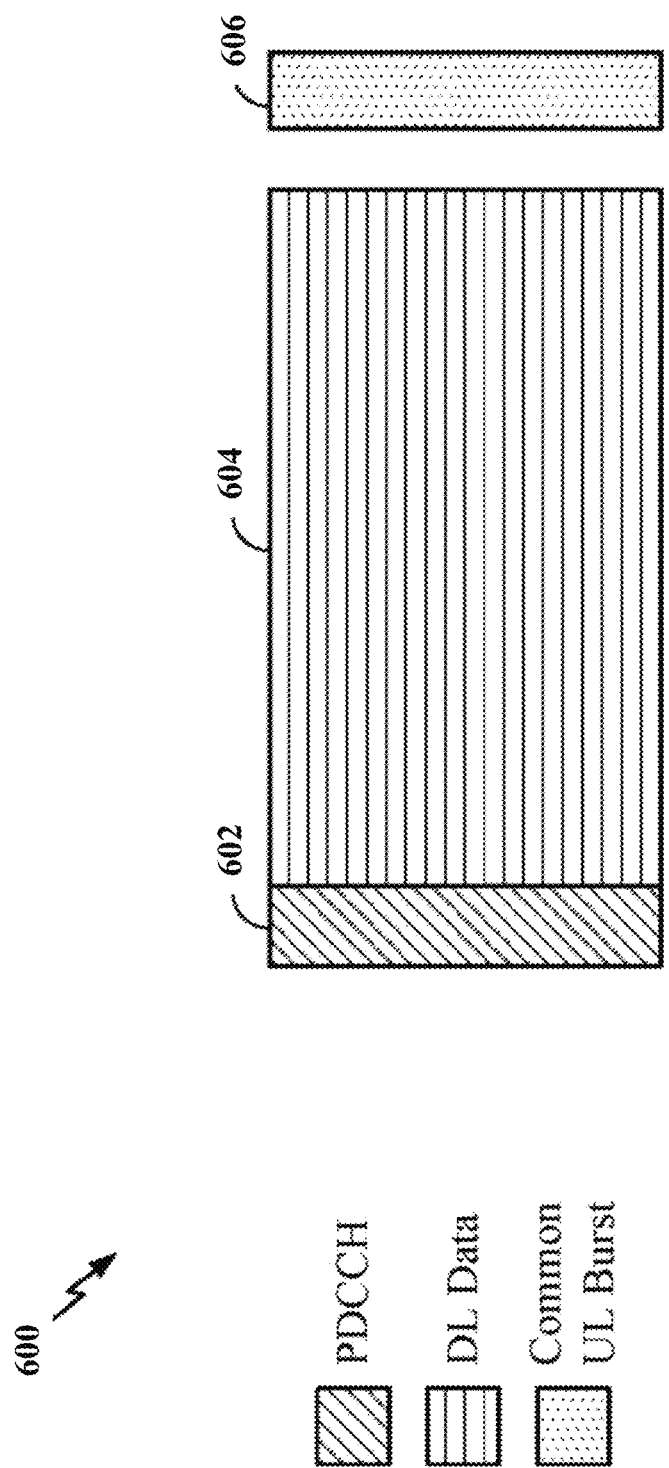
FIG. 6 is a diagram showing an example of a DL-centric subframe.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information.

As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
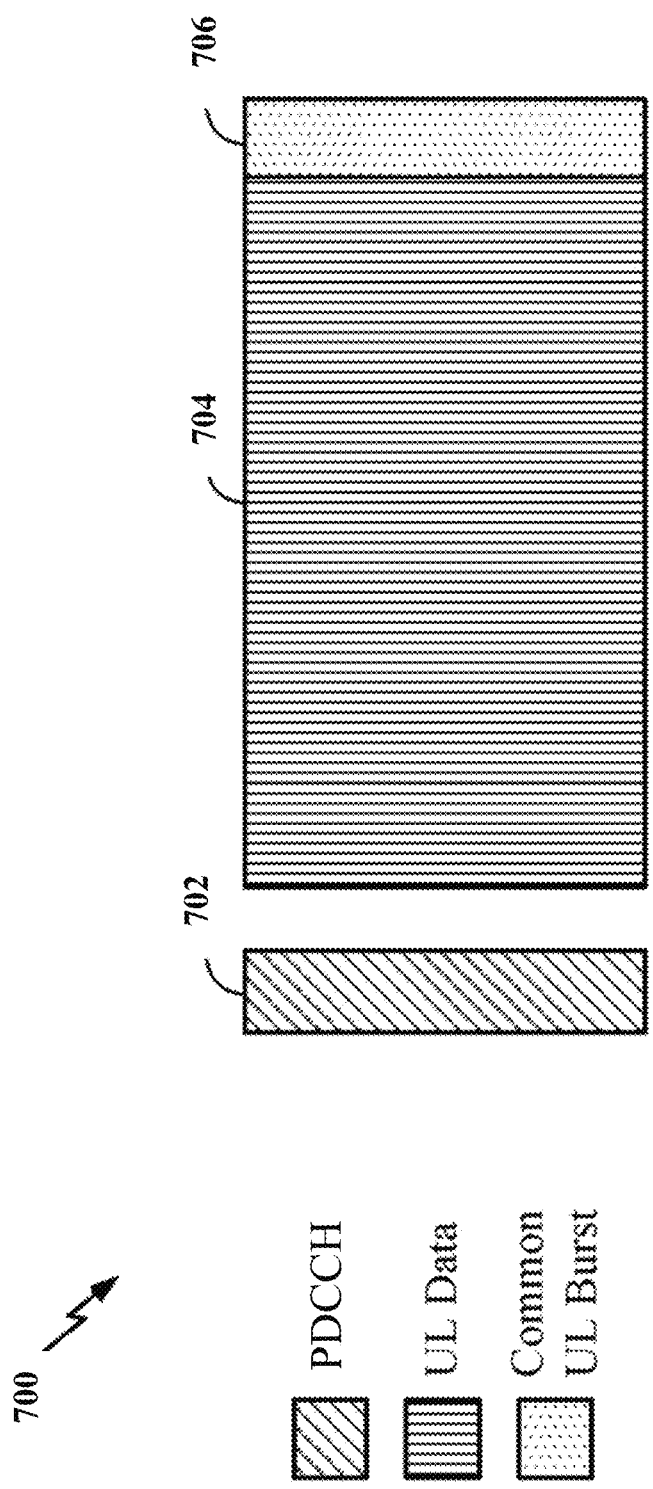
FIG. 7 is a diagram showing an example of an UL-centric subframe.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 8:
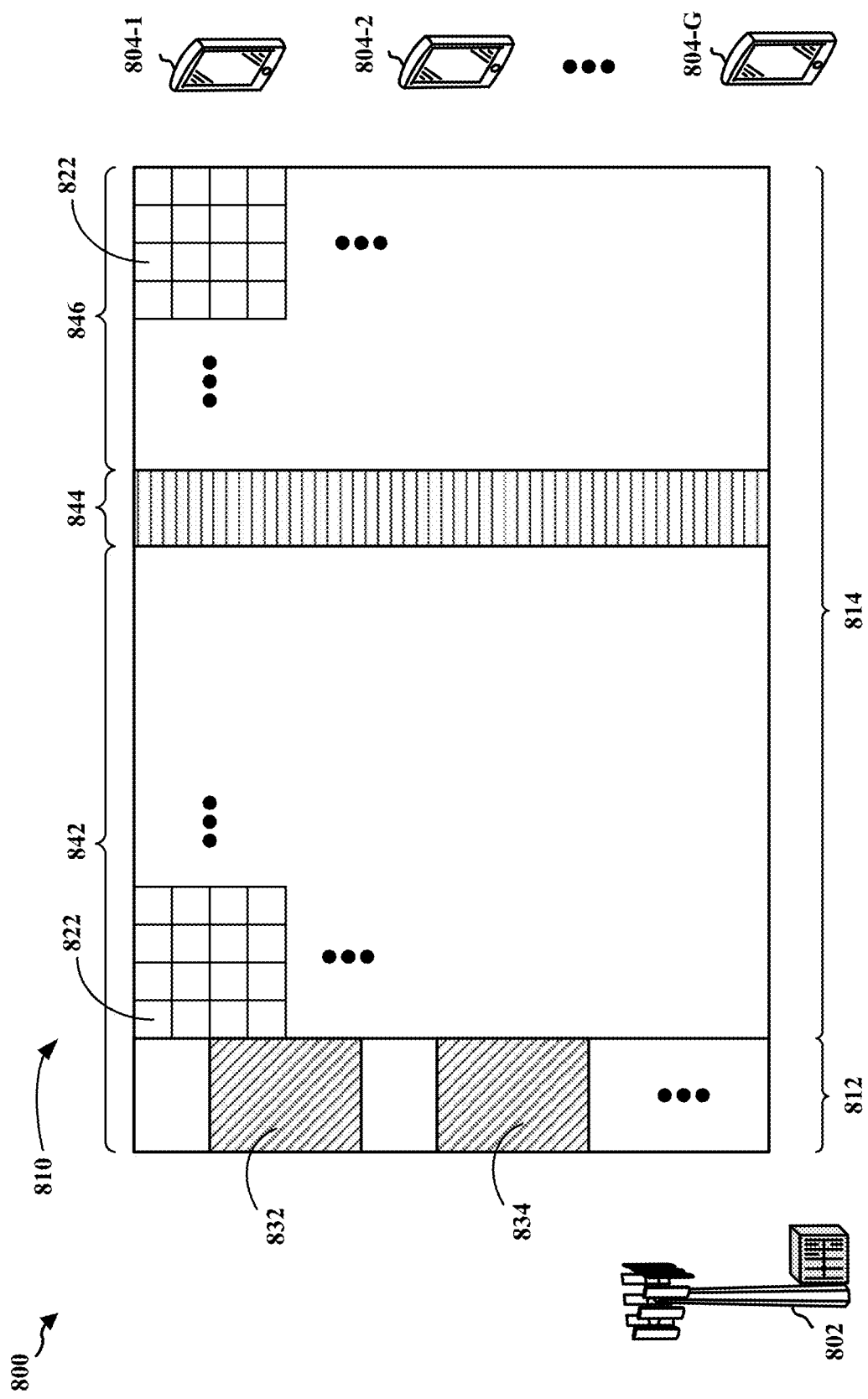
FIG. 8 is a diagram illustrating communications between a base station and UE.

FIG. 8 is a diagram 800 illustrating communications between a base station 802 and UEs 804-1, 804-2, ... 804-G. In particular, the base station 802 communicates with the UEs 804-1, 804-2, ... 804-G on a carrier in a slot 810. The frequency resources and time resources in the slot 810 forms resource elements 822. Each of the resource elements 822 spans one symbol period by one subcarrier.

The slot 810 includes a control region 812 and a data region 814. As described infra, the base station 802 can configure a common CORESET and, optionally, an additional CORESET in the control region 812.

A common CORESET contains a common search space (CSS) and a UE-specific search space (USS). A CSS is to be accessed by one or more groups of UEs. The base station 802 can signal properties of a common CORESET to the UE 804-1 via master information block (MIB) carried by PBCH. The CSS and the USS can be fully or partially overlapped in frequency and time domains for better resource utilization. The base station 802 may not configure all of the properties of a common CORESET described infra via MIB if signaling overhead reduction is needed. Some properties, e.g., REG-to-CCE mapping, search space configurations, can be predefined and, therefore, do not need to be signaled. In addition to the USS, the UE-specific DCI can also be transmitted in the CSS of the common CORESET if there are unused resources in the CSS.

An additional CORESET contains either (a) a CSS and a USS or (b) one or more USSes only. The UE 804-1 can be configured to monitor one or more additional CORESETs via RRC signaling after a cell radio network temporary identifier (C-RNTI) is available. An additional CORESET can have one or more USSes. The base station 802 can configure an additional CORESET for cross-carrier scheduling in carrier scheduling with the UE 804-1. When the UE 804-1 is configured with more than one beam pair link, the UE 804-1 may receive PDCCHs corresponding to different analog beams in an additional CORESET.

In certain configurations, the base station 802 may configure multiple additional CORESETs for the UE 804-1 (i.e., a single UE). The multiple additional CORESETs can be fully or partially overlapped in frequency and time domains.

In certain configurations, the base station 802 may configure multiple additional CORESETs for the UEs 804-1, 804-2, . . . 804-G (i.e., different UEs). The multiple additional CORESETs can be fully or partially overlapped in frequency and time domains. More specifically, if the multiple CORESETs belonging to different UEs are overlapped in physical resources, the base station 802 can transmit only one common PDCCH (e.g., a group common PDCCH). As such, the base station 802 may not need to transmit duplicate information in multiple additional CORESETs belonging to different UEs.

In a mmWave system, multiple analog beams exist. Multiple CORESETs belonging to users which have distinct analog beams can be overlapped in physical resources. The network can schedule UEs with the same analog beam in the same slot to strive for better resource utilization. If multiple CORESETs for users having different analog beams have physical resources in a TDM manner, the scheduled UE may need to wait for multiple symbols to receive its PDCCH.

Further, in this example, the control region 812 includes a CORESET 832, a CORESET 834, etc. In addition, the CORESET 832 may be a common CORESET and the CORESET 834 may be an additional CORESET. Further, the slot 810 may be divided into 3 portions: a down-link portion 842 at the beginning, an up-link portion 846 at the end, and a gap portion 844 between the down-link portion 842 and the up-link portion 846. The base station 802 transmits down-link signals to the UE 804-1 in the down-link portion 842. The UE 804-1 transmits up-link signals to the base station 802 in the up-link portion 846. The UE 804-1 and the base station 802 do not transmit signals in the gap portion 844.

As described infra, the CORESET contains multiple properties. The base station 802 can send a CORESET configuration to each of the UEs 804-1, 804-2, . . . 804-G. The CORESET configuration specifies one or more properties of a CORESET (e.g., the CORESET 832 or the CORESET 834). As described supra, the base station 802 signals the CORESET configuration specifying the properties of a common CORESET via MIB and signals a CORESET configuration specifying the properties of an additional CORESET a control message such as an RRC message.

The base station 802 can configure multiple CORESETs for a UE and each CORESET has different properties. This provides scheduling flexibility for the network to transmit PDCCHs in a proper way for supporting divergent services and scenarios. From the perspective of a UE, the UE knows how to blindly decode PDCCH via the property configurations. Moreover, specific property configurations per CORESET helps reduce the UE processing complexity.

In one example, the base station 802 signals a CORESET configuration specifying properties of the CORESET 832 to the UE 804-1. The CORESET 832 is a common CORESET. To indicate the resource elements 822 that forms the CORESET 832, the CORESET configuration may indicate the frequency of the starting physical resource block of the CORESET 832. In addition or alternatively, the CORESET configuration may indicate an offset from the center frequency of the CORESET 832 to a synchronization signal (SS) block. Further, the CORESET 832 (i.e., a common CORESET) is located within the down-link (DL) common bandwidth part. Furthermore, the physical resource block (PRBs) of the CORESET 832 in frequency domain may be continuous. The CORESET 832 may have a predefined bandwidth (e.g., 24 physical resource blocks, 48 physical resource blocks). Thus, based on the frequency of the starting physical resource block or the offset as well as the bandwidth, the UE 804-1 can determine the resource elements 822 forming the CORESET 832 in frequency domain.

Further, in this example, the CORESET 832 (i.e., a common CORESET) occupies one symbol period or a set of contiguous OFDM symbol periods in time domain. The CORESET configuration can indicate the starting symbol period and time duration to specify the time resource allocation of the CORESET 832.

The CORESET 832 may be used to carry periodical messages (e.g., a paging message). The CORESET 832 may also be used to carry a message (e.g., a Random Access Channel (RACH) response message) transmitted within a window of resource. The base station 802 does not transmit these messages in every time slot. Thus, the base station 802 may not configure a common CORESET for the UE 804-1 in each time slot. Accordingly, the CORESET configuration may indicate the periodicity of the CORESET 832.

In certain configurations, the numerology of the CORESET 832 can be the same as the numerology of SS block. Therefore, the CORESET configuration may not need to indicate the subcarrier spacing of the CORESET 832. The UE 804-1 may determine the subcarrier spacing of the CORESET 832 based on the subcarrier spacing of the SS block. As such, the signaling overhead can be reduced in MIB.

In another example, the base station 802 signals a CORESET configuration specifying properties of the CORESET 834 to the UE 804-1. The CORESET 834 is an additional CORESET. To indicate the resource elements 822 that forms the CORESET 834, the CORESET configuration may indicate bandwidth part and PRB resource allocation for the CORESET 834. The CORESET 834 may contain continuous or non-continuous PRBs in frequency domain. The CORESET configuration may also indicate the bandwidth part on which the additional CORESET is located if more than one bandwidth part is activated for the UE 804-1.

Further, in this example, the CORESET 834 (i.e., an additional CORESET) occupies one symbol period or a set of contiguous OFDM symbol periods in time domain. The CORESET configuration can indicate the starting symbol period and time duration to specify the time resource allocation of the CORESET 834.

The CORESET 834 may be used to carry different periodical messages for different services. Accordingly, the CORESET 834 may be periodical at a slot level or at a symbol level. For example, eMBB users (e.g., the UE 804-1) can be configured to monitor a slot-level CORESET. The URLLC users (e.g., the UE 804-2) can be configured to monitor a symbol-level CORESET. Accordingly, the CORESET configuration may indicate the periodicity of the CORESET 834.

In certain configurations, the CORESET configuration may indicate the numerology (the subcarrier spacing) of the CORESET 834. The numerology can be configured to support different types of service.

In certain configurations, the resource elements 822 are grouped into resource element group (REG). In one example, one REG is formed by 12 continuous resource elements 822 in a single symbol period. Further, the REGs may be grouped into REG bundles. As described infra, one or more REG bundles can be mapped to a particular CCE, depending on configurations. In addition, the base station 802 may choose to interleave all the REG bundles, and then select the one or more REG bundles from the interleaved REG bundles to map to the particular CCE.

When the REG bundles are not interleaved (i.e., non-interleaving REG-to-CCE mapping), the base station 802 may use a predetermined REG bundle size and the UEs 804-1, 804-2, . . . 804-G may be configured with that fixed value for the REG bundle size. Accordingly, the CORESET configuration may not specify the REG bundle size.

When the REG bundles are interleaved (i.e., interleaving REG-to-CCE mapping), the CORESET configuration may indicate the REG bundle size. The UEs 804-1, 804-2, . . . 804-G may perform a channel estimation based on this configuration. Also, the UEs 804-1, 804-2, . . . 804-G performs a reverse interleaving operation based on the REG bundle size. The base station 802 performs an interleaving operation based on a selected REG bundle size, in order to preserve the bundle property after interleaving.

Figure 9:
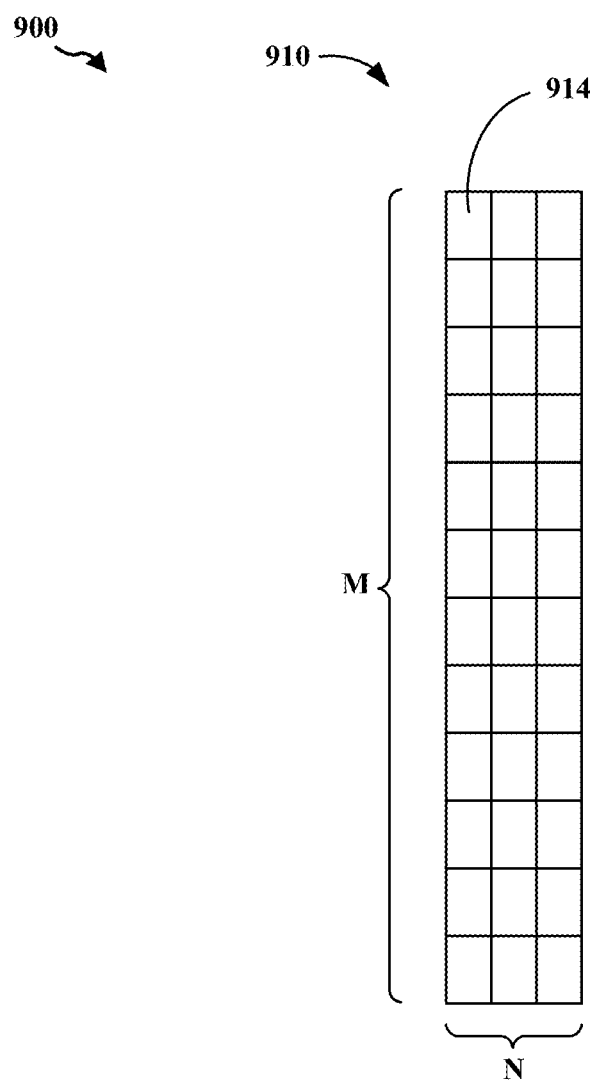
FIG. 9 is a diagram illustrating a REG bundle.

FIG. 9 is a diagram 900 illustrating a REG bundle 910. In particular, the REG bundle 910 is defined as M*N REGs 914. M and N are the REG bundle dimensions in frequency domain and time domain, respectively. M multiplied by N is the configured REG bundle size.

Figure 10:
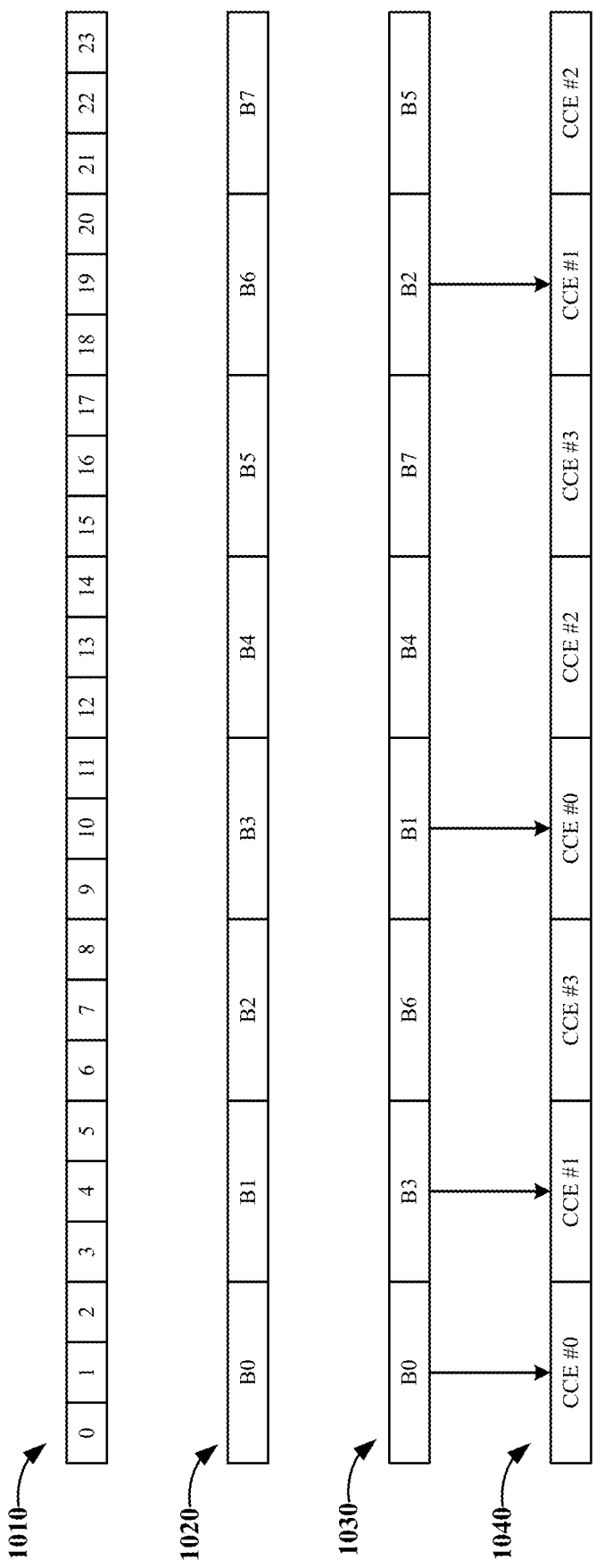
FIG. 10 is a diagram illustrating an interleaving process.

FIG. 10 is a diagram 1000 illustrating an interleaving process performed at the base station 802. Initially, the base station 802 defines REGs in the control region 812 of the slot 810. In this example, the base station 802 defines a REGs 1010, which includes REG 0 to REG 23. The base station 802 then forms REG bundles based on a selected REG bundle size. In this example, the REG bundle size is 3. In particular, the base station 802 forms REG bundles 1020, which are numbered from B0 to B7 in order. The base station 802 then interleaves the REG bundles 1020 to generate interleaved REG bundles 1030. In this example, after interleaving, the interleaved REG bundles 1030 has an order of B0, B3, B6, B1, B4, B7, B2, and B5.

Subsequently, the base station 802 maps the interleaved REG bundles 1030 to CCEs 1040, which are number from CCE 0 to CCE 3. A CCE is allocated P/(M*N) REG bundles from the interleaved REG bundles 1030 based on consecutive logical REG bundle indices, where P is the number of REGs in a CCE. In this example, a CCE contains 6 REGs, thus P being 6. M is 3, and N is 1. Accordingly, each of the CCEs 1040 contains two of the interleaved REG bundles 1030 (i.e., 6 of the REGs 1010). More specifically, REG bundles B0 and B1 are mapped to CCE 0; REG bundles B2 and B3 are mapped to CCE 1; REG bundles B4 and B5 are mapped to CCE 2; REG bundles B6 and B7 are mapped to CCE 2.

A PDCCH candidate includes Q CCEs with consecutive logical CCE indices. Q is the aggregation level of the CCEs (i.e., the number of CCEs utilized for a PDCCH). In this example, the aggregation level is 2. One PDCCH candidate includes CCE 0 and CCE 1.

As described supra, the base station 802 may interleave or not interleave the REG bundles 1020 prior to performing REG-to-CCE mapping. In certain configurations, for a common CORESET, the base station 802 and the UEs 804-1, 804-2, . . . 804-G are configured to use interleaving mapping to strive for a larger frequency diversity. For an additional CORESET, the base station 802 can configure either interleaving or non-interleaving mapping for different channel conditions. The corresponding CORESET configuration may indicate such a REG-to-CCE mapping type. The interleaving mapping may be configured when the CSI feedback of the UEs 804-1, 804-2, . . . 804-G is not available or unreliable to pursue frequency and transmit diversity. While the non-interleaving mapping is configured when the network wants to get the beamforming gain for PDCCH transmission. The UEs 804-1, 804-2, . . . 804-G performs blind decoding based on the specific property configuration.

The CORESET configuration may also specify properties of a corresponding CORESET with respect to the search spaces contained in the CORESET. The CORESET configuration may indicate existed search space types and corresponding number of search spaces. The CORESET configuration may also indicate supported aggregation levels (ALs). One search space does not need to support all agreed ALs; it can support only part of them.

The UEs 804-1, 804-2, . . . 804-G perform blind decoding based on this configuration. Therefore, it can skip the blind decoding candidates for those ALs that are not configured.

For a common CORESET, the CORESET configuration may not need to specify search space configurations. As described supra, a common CORESET contains one CSS and one USS. The aggregation levels in a common CORESET can be defined as high ALs (e.g., 8, and 16) to achieve robust performance.

For an additional CORESET, the CORESET configuration specifying properties regarding the search spaces contained in the additional CORESET. To strive for both good PDCCH performance and lower channel estimation (CE) complexity at the UE, the base station 802 employs a cross-CORESET hierarchical structure. For the low ALs, the small number of REG bundling can achieve better frequency and transmit diversity. For the high ALs, the large number of REG bundling can provide better CE performance.

Figure 11:
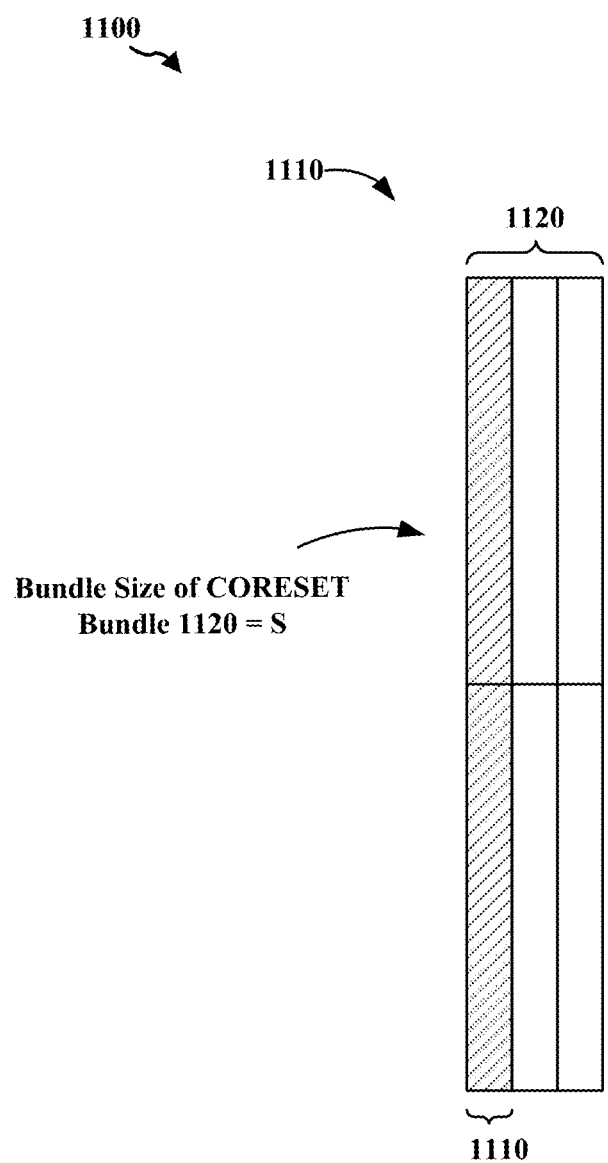
FIG. 11 is diagram illustrating a cross-CORESET hierarchical structure.

FIG. 11 is diagram 1100 illustrating a REG bundle 1110 and a REG bundle 1120 of CORESETs based on a cross-CORESET hierarchical structure. In one scenario, the base station 802 configures a CORESET employing the REG bundle 1120 to support high ALs (e.g., 4, 8, 16) and occupying multiple OFDM symbols in time domain. In this example, the REG bundle 1120 occupies 3 OFDM symbol. The REG bundle size may be fixed as S, where S is the multiple of all supported time durations of a CORESET. For example, if the CORESET can be configured to have 1, 2, or 3 OFDM symbols in time domain, then S is 6 such that all possible time durations are the factors of S. That is, the size of the REG bundle 1120 is 6.

In another scenario, the base station 802 configures another CORESET employing the REG bundle 1110 supporting low ALs (e.g., 1) and having one OFDM symbol in time domain. The REG bundle size of the REG bundle 1110 equals to S divided by the time duration of the REG bundle 1120 supporting high ALs. In this example, the REG bundle 1120 occupies 3 symbol periods. Thus, the REG bundle size of the REG bundle 1110 is 2 (i.e., 6/3).

The CORESET supporting low ALs is located on the first symbol period of the CORESET supporting high ALs. When the REG-to-CCE mapping with non-interleaving (localized mapping) is used for both CORESETs supporting low and high ALs, the UEs 804-1, 804-2, . . . 804-G can assume that the same precoder across Z REG bundles can be used at least in the overlapped search space regions of two CORESETs, where Z is X/Y. X is the REG bundle size of the CORESET supporting low ALs (e.g., the size of the REG bundle 1110).

Y is the REG bundle size of the CORESET supporting high ALs divided by it CORESET time duration.

Such a cross-CORESET structure can enable early initiation of DCI blind decoding. Unified REG bundle size in frequency domain can help to reduce the CE complexity at UE. Further, the CE results of the CORESET supporting high ALs can be reused in the blind decoding for the CORESET supporting low ALs.

The CORESET configuration may also specify properties of a corresponding CORESET with respect to demodulation reference signal (DMRS) configurations. The, CORESET configuration may indicate a demodulation reference signal (DMRS) structure (e.g., 1 bit). The DMRS structure defines the symbol periods occupied by the DMRS (e.g., the first symbol period). The CORESET configuration may indicate the existence of the additional DMRS located on the last symbol of the CORESET.

The front-loaded DMRS structure, i.e., the DMRS is located on the first symbol of the CORESET, can be used to achieve good performance when the UE mobility is low. Also, it has the benefit of relaxing UE processing latency. But when the UE mobility is high, the performance loss may be significant due to inaccurate channel estimation.

Additional DMRS on the last symbol of CORESET may be used to improve the CE performance when the UE is in high speed scenario.

In certain configurations, the UEs 804-1, 804-2, ... 804-G may be configured to employ the front-loaded DMRS structure in default. The base station 802 may send a CORESET configuration indicating additional DMRS on the last symbol of CORESET if needed.

In certain configurations, the CORESET configuration may specifies properties with respect to DMRS initialization (e.g., initialization seed). Further, the CORESET configuration may specifies properties with respect to DMRS port if orthogonal multi user (MU) access is supported.

Figure 12:
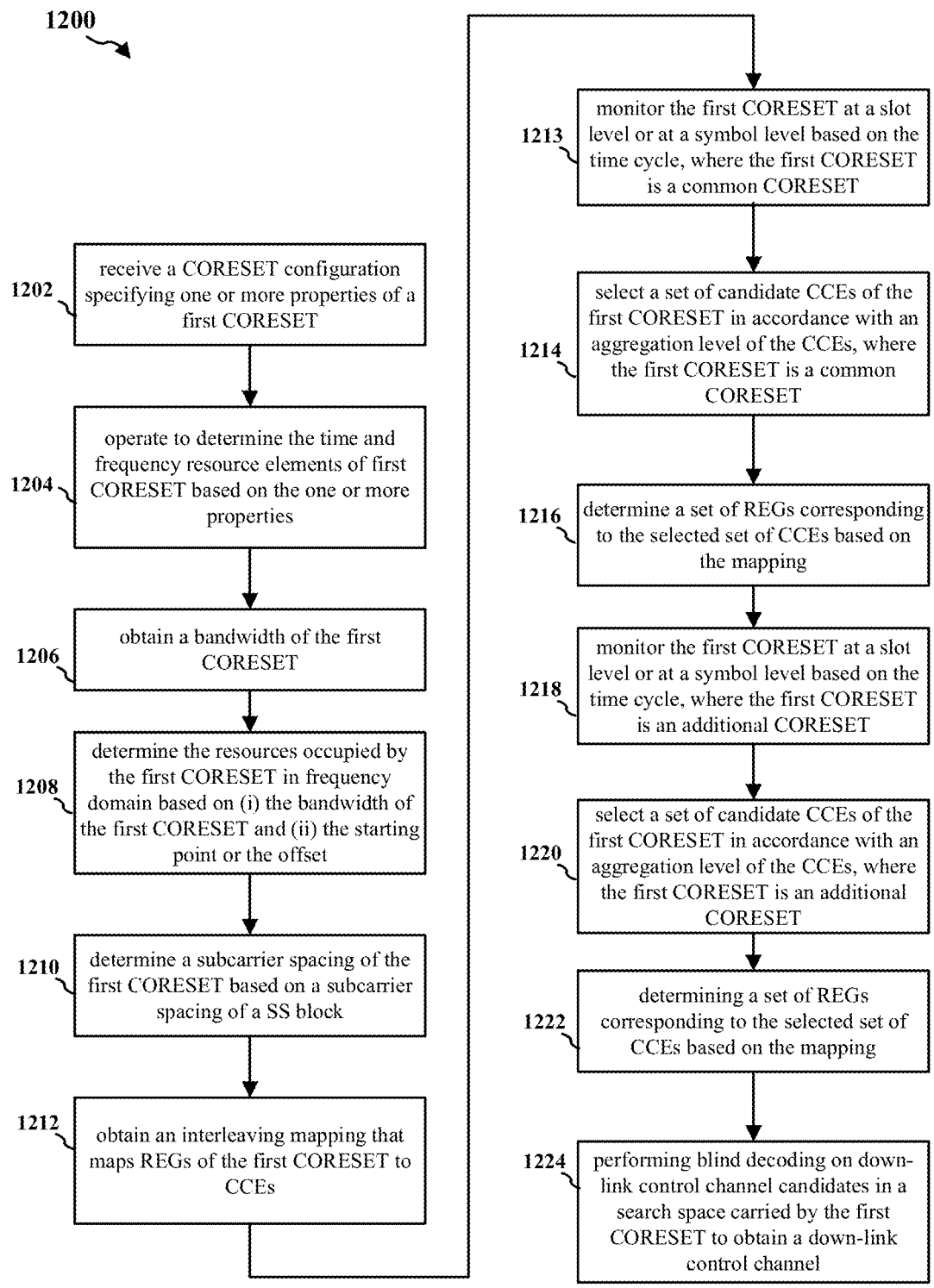
FIG. 12 is a flow chart of a method (process) for determining a CORESET and perform blind decoding on the CORESET.

FIG. 12 is a flow chart 1200 of a method (process) for determining a CORESET and perform blind decoding on the CORESET. The method may be performed by a UE (e.g., the UE 804-1, the apparatus 1302, and the apparatus 1302').

At operation 1202, the UE receives a CORESET configuration specifying one or more properties of a first CORESET. At operation 1204, the UE operates to determine the time and frequency resource elements of first CORESET based on the one or more properties.

In certain configurations, the one or more properties include at least one of: (a) resources occupied by the first CORESET in frequency domain, (b) resources occupied by the first CORESET in time domain, (c) a time cycle used for monitoring the down-link control channel candidates in the search space in the first CORESET, (d) a sub-carrier spacing of the frequency resources occupied by the first CORESET, (e) a mapping between resource element groups (REGs) to Control-Channel Elements (CCEs) of the first CORESET, (f) a search space configuration defining one or more search spaces contained in the first CORESET, (g) a first REG bundle size of a REG bundle of the first CORESET, and (h) a Demodulation Reference Signal (DMRS) configuration of DMRSs carried in the first CORESET.

In one example, the one or more properties include the resources occupied by the first CORESET in time domain. The CORESET configuration indicates a starting symbol period of the first CORESET and a duration of the first CORESET.

In one example, the one or more properties include the search space configuration. The search space configuration indicates a type and a number of candidates at each CCE aggregation level of each search space of the one or more search spaces.

In one example, the one or more properties include the DMRS configuration. The DMRS configuration indicates at least one of a symbol period in which a DMRS is located, a DMRS initialization seed, and a DMRS port.

In one example, the CORESET configuration is received through a system information transmission. The system information transmission is a Master Information Block.

In one example, the first CORESET is a common CORESET, which includes a common search space and a UE specific search space. The one or more properties include the resources occupied by the first CORESET in frequency domain. The CORESET configuration indicates a starting point of the first CORESET in frequency domain or indicates an offset of a center frequency of the first CORESET from a SS block.

In certain configurations, the UE, at operation 1206, obtains a bandwidth of the first CORESET. At operation 1208, the UE determines the resources occupied by the first CORESET in frequency domain based on (i) the bandwidth of the first CORESET and (ii) the starting point or the offset. In one example, the first CORESET is located in a common down-link bandwidth part. In one example, the bandwidth is configured at the UE as a number of physical resource blocks.

In one example, the one or more properties include a time cycle used for monitoring the down-link control channel candidates in search space in the first CORESET in accordance with a periodicity of a control message carried by the first CORESET. In one example, the control message carried by the first CORESET is a paging message, a random access channel (RACH) response message, or a system information message.

In certain configurations, the UE, at operation 1210, determines a subcarrier spacing of the first CORESET based on a subcarrier spacing of a SS Block.

In certain configurations, the UE, at operation 1212, obtains a mapping that maps REGs of the first CORESET to CCEs of the first CORESET, the mapping being an interleaving mapping.

In one example, the UE, at operation 1213, monitors the first CORESET at a slot level or at a symbol level based on the time cycle, where the first CORESET is a common CORESET. At operation 1214, the UE selects a set of candidate CCEs of the first CORESET in accordance with an aggregation level of the CCEs, where the first CORESET is a common CORESET. At operation 1216, the UE determines a set of REGs corresponding to the selected set of CCEs based on the mapping. In one example, the REGs of the first CORSET are grouped into a plurality of REG bundles.

The plurality of REG bundles is interleaved. The CCEs are formed based on the interleaved REG bundles.

In one example, the CORESET configuration is received through a control message.

In one example, the control message is a UE-specific RRC message.

In one example, the first CORESET is an additional CORESET, which includes one or more UE specific search spaces. In one example, the additional CORESET further includes a common search space. In one example, the one or more properties include the resources occupied by the first CORESET in frequency domain. The CORESET configuration indicates physical resource blocks occupied by the first CORESET. In one example, the physical resource blocks are continuous. In one example, the physical resource blocks are non-continuous.

In one example, the UE is configured with more than one bandwidth part. The CORESET configuration further indicates a bandwidth part of the more than one bandwidth part in which the first CORESET is located.

In one example, the UE, at operation 1218, monitors the first CORESET at a slot level or at a symbol level based on the time cycle, where the first CORESET is an additional CORESET. In one example, the one or more properties include a subcarrier spacing of the first CORESET. In one example, the one or more properties include the mapping that maps REGs to CCEs of the first CORESET. The UE, at operation 1220, selects a set of candidate CCEs of the first CORESET in accordance with an aggregation level of the CCEs, where the first CORESET is an additional CORESET. At operation 1222, the UE determines a set of REGs corresponding to the selected set of CCEs based on the mapping. In one example, the REGs of the first CORSET are grouped into a plurality of REG bundles. The plurality of REG bundles are interleaved. The CCEs are formed based on the interleaved REG bundles. In one example, the mapping is an interleaving mapping. In one example, the mapping is a non-interleaving mapping.

In one example, the one or more properties include the first REG bundle size. The REG bundle has a first number of REGs in a symbol period, the first number being equal to a second REG bundle size of the first CORESET when the first CORESET occupies one symbol period in time domain.

At operation 1224, the UE performs blind decoding on down-link control channel candidates in a search space carried by the first CORESET to obtain a down-link control channel. In certain configurations, the blind decoding is performed on the set of REGs in the search space of operation 1214. In certain configurations, the blind decoding is performed on the set of REGs in the search space of operation 1222.

Figure 13:
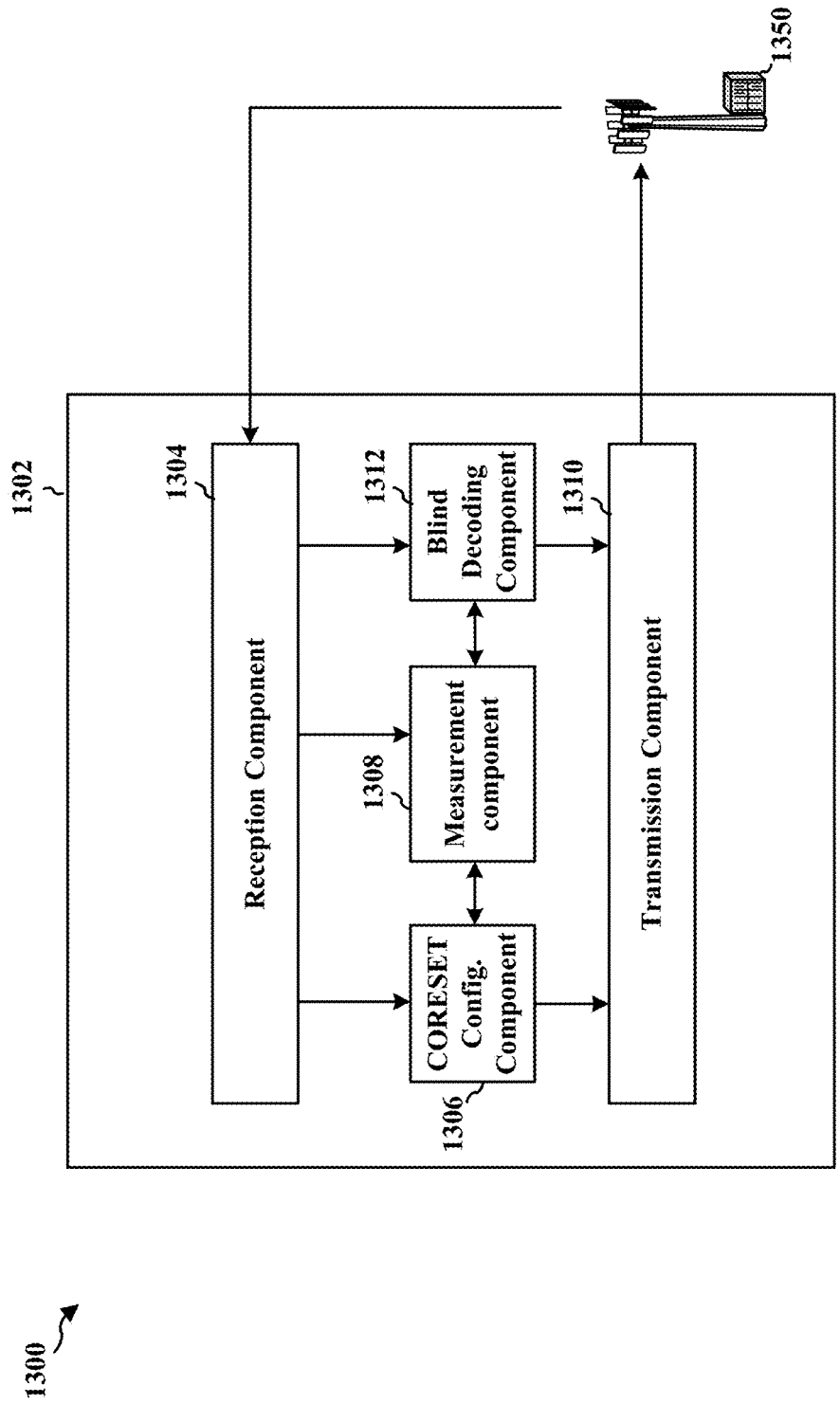
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, a CORESET configuration component 1306, a blind decoding component 1308, and a transmission component 1310.

The reception component 1304 receives a CORESET configuration specifying one or more properties of a first CORESET. The CORESET configuration component 1306 operates to determine the time and frequency resource elements of first CORESET based on the one or more properties.

In certain configurations, the one or more properties include at least one of: (a) resources occupied by the first CORESET in frequency domain, (b) resources occupied by the first CORESET in time domain, (c) a time cycle used for monitoring the down-link control channel candidates in the search space in the first CORESET, (d) a sub-carrier spacing of the frequency resources occupied by the first CORESET, (e) a mapping between resource element groups (REGs) to Control-Channel Elements (CCEs) of the first CORESET, (f) a search space configuration defining one or more search spaces contained in the first CORESET, (g) a first REG bundle size of a REG bundle of the first CORESET, and (h) a Demodulation Reference Signal (DMRS) configuration of DMRSs carried in the first CORESET.

In one example, the one or more properties include the resources occupied by the first CORESET in time domain. The CORESET configuration indicates a starting symbol period of the first CORESET and a duration of the first CORESET.

In one example, the one or more properties include the search space configuration. The search space configuration indicates a type and a number of candidates at each CCE aggregation level of each search space of the one or more search spaces.

In one example, the one or more properties include the DMRS configuration. The DMRS configuration indicates at least one of a symbol period in which a DMRS is located, a DMRS initialization seed, and a DMRS port.

In one example, the CORESET configuration is received through a system information transmission. The system information transmission is a Master Information Block.

In one example, the first CORESET is a common CORESET, which includes a common search space and a UE specific search space. The one or more properties include the resources occupied by the first CORESET in frequency domain. The CORESET configuration indicates a starting point of the first CORESET in frequency domain or indicates an offset of a center frequency of the first CORESET from a SS block.

In certain configurations, the CORESET configuration component 1306 obtains a bandwidth of the first CORESET. The CORESET configuration component 1306 determines the resources occupied by the first CORESET in frequency domain based on (i) the bandwidth of the first CORESET and (ii) the starting point or the offset. In one example, the first CORESET is located in a common down-link bandwidth part. In one example, the bandwidth is configured at the UE as a number of physical resource blocks.

In one example, the one or more properties include a time cycle used for monitoring the down-link control channel candidates in search space in the first CORESET in accordance with a periodicity of a control message carried by the first CORESET. In one example, the control message carried by the first CORESET is a paging message, a random access Channel (RACH) response message, or a system information message.

In certain configurations, the CORESET configuration component 1306 determines a subcarrier spacing of the first CORESET based on a subcarrier spacing of a SS Block.

In certain configurations, the CORESET configuration component 1306 obtains a mapping that maps REGs of the first CORESET to CCEs of the first CORESET, the mapping being an interleaving mapping. The CORESET configuration component 1306 selects a set of candidate CCEs of the first CORESET in accordance with an aggregation level of the CCEs, where the first CORESET is a common CORESET. The CORESET configuration component 1306 determines a set of REGs corresponding to the selected set of CCEs based on the mapping. In one example, the REGs of the first CORSET are grouped into a plurality of REG bundles. The plurality of REG bundles is interleaved. The CCEs are formed based on the interleaved REG bundles.

In one example, the CORESET configuration is received through a control message.

In one example, the control message is a UE-specific RRC message.

In one example, the first CORESET is an additional CORESET, which includes one or more UE specific search spaces. In one example, the additional CORESET further includes a common search space. In one example, the one or more properties include the resources occupied by the first CORESET in frequency domain. The CORESET configuration indicates physical resource blocks occupied by the first CORESET. In one example, the physical resource blocks are continuous. In one example, the physical resource blocks are non-continuous.

In one example, the UE is configured with more than one bandwidth part. The CORESET configuration further indicates a bandwidth part of the more than one bandwidth part in which the first CORESET is located.

In one example, the blind decoding component 1308 monitors the first CORESET at a slot level or at a symbol level based on the time cycle.

In one example, the one or more properties include a subcarrier spacing of the first CORESET.

In one example, the one or more properties include the mapping that maps REGs to CCEs of the first CORESET. The blind decoding component 1308 selects a set of candidate CCEs of the first CORESET in accordance with an aggregation level of the CCEs, where the first CORESET is an additional CORESET. The blind decoding component 1308 determines a set of REGs corresponding to the selected set of CCEs based on the mapping. In one example, the REGs of the first CORSET are grouped into a plurality of REG bundles. The plurality of REG bundles is interleaved. The CCEs are formed based on the interleaved REG bundles. In one example, the mapping is an interleaving mapping. In one example, the mapping is a non-interleaving mapping.

In one example, the one or more properties include the first REG bundle size. The REG bundle has a first number of REGs in a symbol period, the first number being equal to a second REG bundle size of the first CORESET when the first CORESET occupies one symbol period in time domain.

The blind decoding component 1308 performs blind decoding on down-link control channel candidates in a search space carried by the first CORESET to obtain a down-link control channel. In certain configurations, the blind decoding is performed on the set of REGs in the search space.

Figure 14:
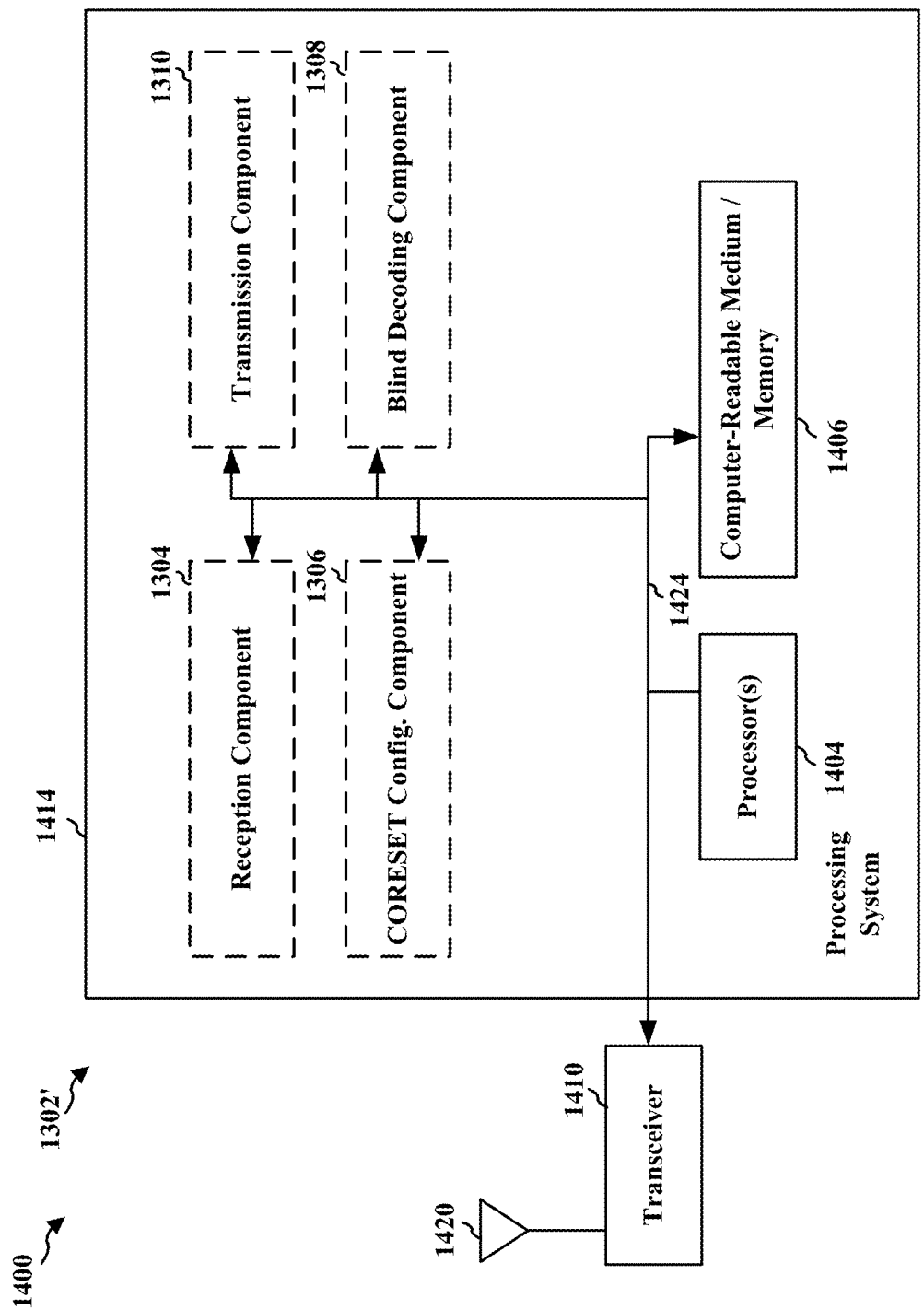
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be a UE. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, the reception component 1304, the CORESET configuration component 1306, the blind decoding component 1308, the transmission component 1310, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 354. The transceiver 1410 is coupled to one or more antennas 1420, which may be the communication antennas 352.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1304, the CORESET configuration component 1306, the blind decoding component 1308, and the transmission component 1310. The components may be software components running in the one or more processors 1404, resident/stored in the computer readable medium/memory 1406, one or more hardware components coupled to the one or more processors 1404, or some combination thereof. The processing system 1414 may be a component of the UE 350 and may include the memory 360 and/or at least one of the TX processor 368, the RX processor 356, and the communication processor 359.

In one configuration, the apparatus 1302/apparatus 1302' for wireless communication includes means for performing each of the operations of FIG. 12. The aforementioned means may be one or more of the aforementioned components of the apparatus 1302 and/or the processing system 1414 of the apparatus 1302' configured to perform the functions recited by the aforementioned means.

As described supra, the processing system 1414 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving a UE-specific radio resource control (RRC) message containing a control resource set (CORESET) configuration explicitly specifying (a) time and frequency of resource elements of a first CORESET and (b) a demodulation reference signal (DMRS) configuration indicating a DMRS initialization;
   determining the time and frequency of resource elements of the first CORESET based on the CORESET configuration; and
   performing blind decoding on down-link control channel candidates in a search space carried by the first CORESET to obtain a down-link control channel, wherein the CORESET configuration further explicitly specifies properties with respect to DMRS port for supporting orthogonal multi-user (MU) access, where the method further comprises:
   performing blind decoding on down-link control channel candidates based on the specified DMRS port properties.

2. The method of claim 1, wherein the DMRS configuration further specifies a front-loaded DMRS structure, wherein the front-loaded DMRS structure defines that DMRSs occupy an initial symbol period of the first CORESET.

3. The method of claim 2, wherein the CORESET configuration further indicates that additional DMRSs occupy a last symbol period of the CORESET, where the method further comprises:
   performing channel estimation using both the front-loaded DMRS structure and the additional DMRSs.

4. The method of claim 1, wherein the CORESET configuration further specifies a type and a number of candidates at each control channel element (CCE) aggregation level of each search space of the one or more search spaces.

5. The method of claim 1, wherein the CORESET configuration indicates a starting point of the first CORESET in the frequency domain or indicates an offset of a center frequency of the first CORESET from a synchronization signal (SS) block.

6. The method of claim 1, wherein the CORESET configuration further specifies a time cycle used for monitoring the down-link control channel candidates in the search space in the first CORESET in accordance with a periodicity of a control message carried by the first CORESET.

7. The method of claim 1, further comprising:
   determining a subcarrier spacing of the first CORESET based on a subcarrier spacing of a Synchronization Signal (SS) Block.

8. The method of claim 1, wherein the UE is configured with more than one bandwidth part, wherein the CORESET configuration further indicates a bandwidth part of the more than one bandwidth part in which the first CORESET is located.

9. The method of claim 1, wherein the CORESET configuration further specifies a subcarrier spacing of the first CORESET.

10. The method of claim 1, wherein the CORESET configuration further specifies a mapping that maps resource element groups (REGs) to CCEs of the first CORESET, the method further comprising:
    selecting a set of candidate CCEs of the first CORESET in accordance with an aggregation level of the CCEs; and
    determining a set of REGs corresponding to the selected set of CCEs based on the mapping, wherein the blind decoding is performed on the set of REGs in the search space.

11. The method of claim 1, wherein the CORESET configuration further specifies a first REG bundle size, wherein the REG bundle has a first number of REGs in a symbol period, the first number being equal to a second REG bundle size of the first CORESET when the first CORESET occupies one symbol period in the time domain.

12. An apparatus for wireless communication, the apparatus being a user equipment (UE), comprising:
    a memory; and
    at least one processor coupled to the memory and configured to:
    receive a UE-specific radio resource control (RRC) message containing a control resource set (CORESET) configuration explicitly specifying (a) time and frequency of resource elements of a first CORESET and (b) a demodulation reference signal (DMRS) configuration indicating a DMRS initialization;
    determine the time and frequency of resource elements of the first CORESET based on the CORESET configuration; and
    perform blind decoding on down-link control channel candidates in a search space carried by the first CORESET to obtain a down-link control channel, wherein the CORESET configuration further explicitly specifies properties with respect to DMRS port for supporting orthogonal multi-user (MU) access, and wherein the at least one processor is further configured to perform blind decoding on down-link control channel candidates based on the specified DMRS port properties.

13. The apparatus of claim 12, wherein the DMRS configuration further specifies a front-loaded DMRS structure, wherein the front-loaded DMRS structure defines that DMRSs occupy an initial symbol of the first CORESET.

14. The apparatus of claim 13, wherein the CORESET configuration further indicates that additional DMRSs occupy a last symbol period of the CORESET, and wherein the at least one processor is further configured to perform channel estimation using both the front-loaded DMRS structure and the additional DMRSs.

15. The apparatus of claim 12, wherein the CORESET configuration further specifies a type and a number of candidates at each control channel element (CCE) aggregation level of each search space of the one or more search spaces.

16. The apparatus of claim 12, wherein the CORESET configuration indicates a starting point of the first CORESET in the frequency domain or indicates an offset of a center frequency of the first CORESET from a synchronization signal (SS) block.

17. The apparatus of claim 12, wherein the at least one processor is further configured to determine a subcarrier spacing of the first CORESET based on a subcarrier spacing of a Synchronization Signal (SS) Block.

18. A non-transitory computer-readable medium storing computer executable code for wireless communication of a user equipment (UE), comprising code to:
  receive a UE-specific radio resource control (RRC) message containing a control resource set (CORESET) configuration explicitly specifying (a) time and frequency of resource elements of a first CORESET and (b) a demodulation reference signal (DMRS) configuration indicating a DMRS initialization;
  determine the time and frequency of resource elements of the first CORESET based on the CORESET configuration; and
  perform blind decoding on down-link control channel candidates in a search space carried by the first CORESET to obtain a down-link control channel, wherein the CORESET configuration further explicitly specifies properties with respect to DMRS port for supporting orthogonal multi-user (MU) access, where the code is further configured to:
  perform blind decoding on down-link control channel candidates based on the specified DMRS port properties.

* * * * *